Oct. 14, 1947. T. L. FAWICK 2,428,933
ASSEMBLY FOR CLUTCHES OR BRAKES
Filed March 19, 1945

INVENTOR
THOMAS L. FAWICK
BY
Willard D. Eakin
ATTORNEY

Patented Oct. 14, 1947

2,428,933

UNITED STATES PATENT OFFICE 2,428,933

ASSEMBLY FOR CLUTCHES OR BRAKES

Thomas L. Fawick, Akron, Ohio

Application March 19, 1945, Serial No. 583,532

4 Claims. (Cl. 188—152)

This invention relates to fluid-actuated assemblies suitable for use as clutches or brakes.

Its chief objects are to provide an assembly comprising improved means for assuring prompt and complete disengagement of the clutch or brake upon the venting of pressure fluid from a fluid-distensible actuating member; and to provide simplicity and economy of construction and facility of assembly, disassembly and repair.

Figure 1:
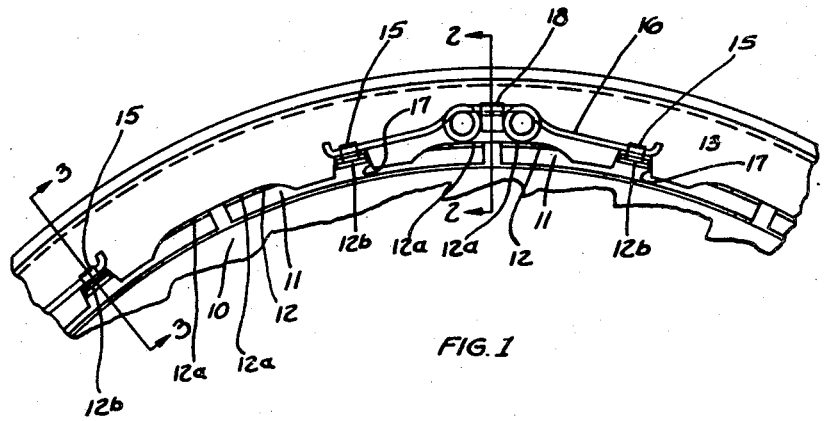
Fig. 1 is a fragmentary elevation of an assembly embodying my invention in its preferred form.

Referring to the drawings, the specific embodiment here shown comprises a drum 10 having an outer surface adapted to be frictionally engaged by a circumferential series of wear-shoes 11 of suitable brake-lining material, each of which is secured, as by vulcanization, to a metal base-plate 12.

The mounting for these wear-shoe assemblies comprises an annular, but permissibly sectional, inwardly open channel member 13 of sheet metal in the channel of which is mounted an annular, but permissibly sectional, fluid-distensible bag 14 of cord-reinforced rubber having means (not shown) for conducting distending fluid into it to cause it to distend radially inward, to force the wear-shoes 11 into engagement with the drum 10, and out of it to permit the wear-shoes to be retracted from the drum.

Each of the base plates 12 is formed at each of its ends with oppositely projecting stop-lug portions 12a, 12a adapted to come against the stop-face edges of the side flanges of the channel member 13, to limit the outward movement of the wear-shoes.

Also, at its middle, each base plate 12 is formed with a pair of oppositely projecting lugs 12b, 12b, to the outer face of each of which is secured, as by welding, a spring-engaging eye or hook member 15, in which is engaged the end portion of a spring 16 which constantly urges the base plate and its wear-shoe outwardly.

Figure 2:
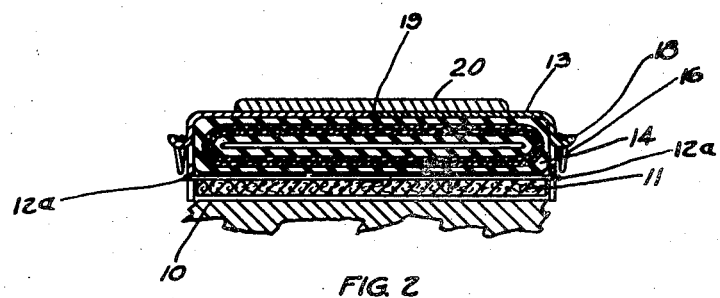
Fig. 2 is a section on line 2—2 of Fig. 1.

The springs 16 are mounted in pairs on the outer faces of the side flanges of the channel member 13, where they are readily accessible, the lugs 12b of the base plates, with their hook members 15, projecting outward through respective outwardly tapered notches 17, 17 formed in the inner margins of the said side flanges, and each spring 16 being anchored at its middle by being engaged in a hook 18 formed by stamping and bending a part of the side flange of the sheet-metal channel member, as clearly shown in Fig. 2.

Each pair of springs, opposite each other on the outer faces of the channel member 13, engages the hooks 15 of two adjacent base plates, so that one pair of springs serves for two of the wear-shoes. Preferably, for low-modulus, long range action without high maximum strain, the springs are of the loop type as shown.

The wear-shoes 11 or base plates 12 do not require to be secured to the distensible member 14 since the springs 16 provide for their retraction and since the torque is sustained by metal-to-metal contact of the lugs 12b in the notches 17 of the channel member's side flanges.

When the notches 17 are outwardly tapered as shown, there is some self-energizing effect in the engagement of the clutch or brake, which, according to the degree of taper, can be only sufficient to partially or wholly offset frictional resistance of the lugs 12b, or can be of greater magnitude.

Figure 3:
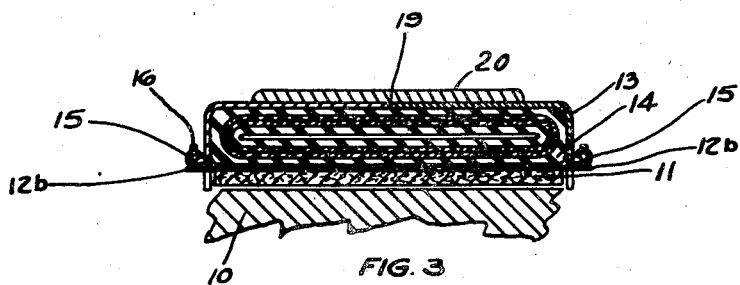
Fig. 3 is a section on line 3—3 of Fig. 1.

Preferably, for economy, the channel member 13 is made as two annular sections which are joined together by welding, the weld seam being shown at 19, Figs. 2 and 3, which permits both of the sections to be made by the same simple and inexpensive die equipment.

The channel member 13 can be provided with a relatively heavy backing member or members such as the member 20 on its outer face for strengthening it and for mounting it.

An advantage of the structure as described, having the channel member 13 formed of sheet metal, is that the actuating assembly is of small radial dimension, for compactness and economy of space.

Another advantage is that when the distensible bag is vented and the outward movement of the shoes is stopped by the lugs 12a the bag withdraws slightly from the base plates 12, providing an air space as shown for cooling effect.

When the construction is as shown, with the notches 17 symmetrically tapered in the direction of the disengaging movement of the shoes, the self-energizing effect is present regardless of which is the driving and which the driven structure and in either direction of drive. As the lug 12b moves inward or outward in contact with a wall of its notch 17, a slight relative circumferential movement occurs between the shoe and its mounting 13, and this is permitted by slidability of the spring 16 in the hook member 15.

The invention also provides the advantages that are set out in the above statement of objects and modifications are possible without sacrifice of

I claim:

1. An assembly comprising two relatively rotatable structures adapted for frictional engagement with each other, one of the same having an annular frictional-engagement surface and the other comprising a circumferential series of wear-shoe structures for engagement with said surface, a fluid distensible member for moving them into such engagement, a channel shaped member constituting a mounting for said fluid-distensible member, and having opposite side flanges defining the channel, and loop-type cantilever springs mounted on the axially outer sides of the side-flanges and engaged with the wear-shoe structures for retracting them from said surface upon venting of the fluid-distensible member, each of the springs being anchored to the adjacent side-flange and having its loop so arranged between its point of such anchorage and its point of engagement with a wear-shoe as to yield in a direction transverse to the retracting movement of the wear-shoe.

2. An assembly comprising two relatively rotatable structures adapted for frictional engagement with each other, one of the same having an annular frictional-engagement surface and the other comprising a circumferential series of wear-shoe structures for engagement with said surface, a fluid distensible member for moving them into such engagement, a channel shaped member constituting a mounting for said fluid-distensible member and having opposite side flanges defining the channel, and a circumferential series of loop-type cantilever springs mounted on the axially outer side of, and anchored to, each of the side flanges and engaged with the wear-shoe structures for retracting them from said surface upon venting of the fluid-distensible member, each of the springs being anchored at its middle to the flange of the channel shaped member and at each side of its anchorage being formed with a loop of at least one full turn and with a cantilever arm in extension from the loop.

3. An assembly comprising two relatively rotatable structures adapted for frictional engagement with each other, one of the same having an annular frictional-engagement surface and the other comprising a circumferential series of wear-shoe structures for engagement with said surface, a fluid-distensible member for moving them into such engagement, a channel shaped member constituting a mounting for said fluid-distensible member and having opposite side flanges defining the channel, and a circumferential series of cantilever springs mounted on the axially outer side of, and anchored to, each of the side flanges and engaged with the wear-shoe structures for retracting them from said surface upon venting of the fluid-distensible member, the springs being radially interlocked with the respective wear-shoe structures but circumferentially slidable with relation thereto, the wear-shoe structures being interlocked with the side flanges for sustension of torque but movable radially with relation thereto, and at least one of the interlocking faces of each pair being so non-radially disposed as to provide a self-energizing effect in the frictional engagement of the two structures.

4. An assembly comprising two relatively rotatable structures adapted for frictional engagement with each other, one of the same having an annular frictional-engagement surface and the other comprising a circumferential series of wear-shoe structures for engagement with said surface, a fluid-distensible member for moving them into such engagement, a channel shaped member constituting a mounting for said fluid-distensible member and having opposite side flanges defining the channel, and springs mounted on the axially outer sides of the side-flanges and engaged with the wear-shoe structures for retracting them from said surface upon venting of the fluid-distensible member, the wear-shoe structures being interlocked with the side flanges for sustension of torque but movable radially with relation thereto, by reason of each wear-shoe structure comprising a transversely flat metal base-plate having lateral projections in at least substantially rectilinear extension thereof which extend into recesses formed in the side flanges.

THOMAS L. FAWICK.

REFERENCES CITED

The following references are of record in the file of this patent:

UNITED STATES PATENTS

| Number | Name | Date |
| --- | --- | --- |
| 2,185,250 | Frank | Jan. 2, 1940 |
| 2,205,521 | Fawick | June 25, 1940 |
| 2,246,979 | Kraft et al. | June 24, 1941 |
| 1,936,899 | Bendix | Nov. 28, 1933 |
| 2,349,494 | Fawick | May 23, 1944 |